US008817898B2

(12) United States Patent
Anderson et al.

(10) Patent No.: US 8,817,898 B2
(45) Date of Patent: *Aug. 26, 2014

(54) OFDM RECEIVERS

(75) Inventors: Adrian John Anderson, Monmouthshire (GB); Paul Damon Murrin, Chepstow (GB)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/199,655

(22) Filed: Sep. 6, 2011

(65) Prior Publication Data

US 2011/0317791 A1 Dec. 29, 2011

Related U.S. Application Data

(63) Continuation of application No. 11/707,208, filed on Feb. 15, 2007, now Pat. No. 8,121,204.

(30) Foreign Application Priority Data

Nov. 17, 2006 (GB) .................................. 0622991.8

(51) Int. Cl.
*H04L 27/28* (2006.01)
*H04L 5/00* (2006.01)
*H04L 25/02* (2006.01)

(52) U.S. Cl.
CPC .......... *H04L 25/0234* (2013.01); *H04L 5/0048* (2013.01); *H04L 5/0007* (2013.01); *H04L 25/0226* (2013.01)
USPC ........... 375/260; 375/267; 375/316; 370/203; 370/208; 370/210; 370/328; 370/334; 370/335; 370/342; 370/435; 370/437; 370/441

(58) Field of Classification Search
USPC ............. 375/240.26, 260, 316, 341; 370/208, 370/210, 340–344
See application file for complete search history.

(56) References Cited

U.S. PATENT DOCUMENTS

| 7,139,320 | B1  |   | 11/2006 | Singh et al. |         |
|-----------|-----|---|---------|--------------|---------|
| 7,248,559 | B2  | * | 7/2007  | Ma et al.    | 370/208 |
| 7,313,086 | B2  | * | 12/2007 | Aizawa       | 370/208 |
| 7,778,337 | B2  | * | 8/2010  | Tong et al.  | 375/260 |

(Continued)

OTHER PUBLICATIONS

"On the Performance of the DVB-T System in Mobile Environments", by R. Burow et al, IEEE Globecom 1998, The Bridge to Global Integration, Telecommunications Conference, New York, Nov. 1998, vol. 4, pp. 2198-2204.

(Continued)

*Primary Examiner* — Daniel Washburn
*Assistant Examiner* — Eboni Hughes
(74) *Attorney, Agent, or Firm* — Michael S. Garrabrants

(57) ABSTRACT

A method and apparatus for filtering a received Orthogonal Frequency Division Multiplexed (ODFM) signal to reduce noise. The ODFM signal includes a plurality of symbols n in the time direction, each symbol including a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol. An m-tap filter is utilized for producing a filtered version of a selected pilot sub-carrier to be used in subsequent interpolation, by inputting into respective taps of the m-tap filter, m pilot sub-carriers surrounding the selected pilot sub-carrier. The m pilot sub-carriers each satisfy a relationship between n and k, wherein the relationship defines a diagonal line in the n-k plane.

29 Claims, 9 Drawing Sheets

(56) References Cited

U.S. PATENT DOCUMENTS

| | | |
|---|---|---|
| 2003/0072254 A1 | 4/2003 | Ma et al. |
| 2003/0142734 A1* | 7/2003 | Black et al. ............... 375/149 |
| 2006/0050774 A1 | 3/2006 | DeMarchi |
| 2007/0076804 A1* | 4/2007 | Sestok et al. ............... 375/260 |
| 2007/0211827 A1* | 9/2007 | Baggen et al. ............... 375/316 |
| 2007/0230601 A1* | 10/2007 | Yim et al. ............... 375/260 |
| 2009/0213948 A1* | 8/2009 | Ma et al. ............... 375/260 |
| 2009/0274038 A1* | 11/2009 | Takeuchi et al. ............... 370/210 |

* cited by examiner

OFDM RECEIVERS

CROSS REFERENCE TO RELATED APPLICATIONS

This is a continuation of prior U.S. application Ser. No. 11/707,208, filed Feb. 15, 2007 now U.S. Pat. No. 8,121,204.

FIELD OF THE INVENTION

The invention relates to a method and apparatus for filtering a received OFDM (Orthogonal Frequency Division Multiplexed) signal. Particularly, but not exclusively, the invention relates to receivers for OFDM signals, in particular mobile TV receivers.

BACKGROUND OF THE INVENTION

OFDM (Orthogonal Frequency Division Multiplexing) is a transmission scheme used in a number of applications including digital audio broadcasting and digital TV systems (e.g. DVB-T (Digital Video Broadcasting-Terrestrial), DVB-H (Digital Video Broadcasting-Handheld) and ISDB-T (Integrated Services Digital Broadcasting-Terrestrial)).

The bit stream that is to be transmitted is split into several parallel bit streams, typically hundreds or thousands. The available frequency spectrum is split into several channels and each low bit rate stream is transmitted over one channel using some sort of known modulation scheme e.g. QAM (Quadrature Amplitude Modulation) or PSK (Phase Shift Keying). The channel frequencies are chosen such that the modulated data streams are orthogonal to each other. This means that each channel can be deciphered independently at the receiver, since cross-talk between the sub-channels is eliminated.

In practice, each of the sub-channels may be distorted by the transmission channel such that the amplitude and phase of each sub-carrier must be equalised in the receiver to give good performance using coherent demodulation. The receiver needs a good estimate of the transmission channel in order to carry out equalisation. In order to deal with this in the digital TV systems mentioned above, scattered pilots are inserted at regular intervals across the frequency span of each symbol. Each pilot is a symbol transmitted with known amplitude and phase and the pilots are used for channel estimation in the receiver. In the particular transmission schemes discussed above, every 12th sub-carrier (in the frequency direction) of each symbol is a pilot.

In order to increase the effective sampling frequency of the channel (in the frequency direction), in the digital TV systems mentioned above, the pilot sampling grid is advanced by three sub-carriers on every consecutive symbol in time. This leads to a pilot sampling grid in the time-frequency plane as shown in FIG. 1.

In FIG. 1, time (i.e. symbol number n) is shown on the y-axis. The oldest symbol is at the top of the plot (symbol number 0) and the most recently received symbol is at the bottom of the plot (symbol number 15). Frequency (i.e. sub-carrier k) is shown on the x-axis. Typically, there will be many more sub-carriers per symbol than are shown in FIG. 1. As indicated by the key of FIG. 1, each sub-carrier is shown by a dot and the scattered pilot sub-carriers are shown by a dot overlaid with a rectangle.

Note, in FIG. 1, that some sub-carriers, such as sub-carrier index k=0, are designated continual pilots and as such are transmitted as a known pilot for every symbol n.

Channel estimation at the receiver usually uses the scattered pilots. In the process, the receiver aims to form an estimate of the distortion applied by the channel for each sub-carrier of each symbol received. This may be done either by interpolating (upsampling) the scattered pilots by a factor 4 in the frequency direction. This will give a line of virtual pilots at every third sub-carrier in the frequency direction. These resulting virtual pilots can be interpolated by a factor 3 in the frequency direction to give a sample of the channel response for every sub-carrier. Alternatively, the interpolation may be done by interpolating the scattered pilots by a factor 4 in the time direction. This will also give a line of virtual pilots at every third sub-carrier in the frequency direction. These resulting virtual pilots can be interpolated by a factor 3 in the frequency direction to give a sample of the channel response for every sub-carrier Of course, this principle also applies for different spacings of the scattered pilots. If the spacing between pilots in each symbol is a sub-carriers (in the case above, a=12) and adjacent symbol pilots are shifted by b sub-carriers (in the case above b=3), the first interpolation, in the time or frequency domain, will be by a factor of a/b and the second interpolation, in the frequency domain, will be by a factor b.

Because this relates to mobile technology, we consider a fading channel i.e. one in which the receiver is moving through the interference pattern of the transmitter. The superposition of the Doppler-shifted carrier wave leads to a fluctuation of the carrier amplitude and phase. This means that the received signal is amplitude and phase modulated by the channel. Whether the first stage of the interpolation is carried out in the frequency direction or in the time direction will depend on the magnitude of the delay spread and on the magnitude of the Doppler frequency. The requirement to interpolate the scattered pilots by a factor 4 (in either domain) places an upper limit on the maximum tolerable delay spread.

If the delay spread falls outside $$-\frac{T_u}{24}$$

to $$\frac{T_u}{24},$$

where $T_u$ is the useful symbol duration, the interpolation in the frequency axis will cause aliasing and, as a result, the channel estimation will be inaccurate. Thus, interpolation in the frequency direction is only applied when the delay spread falls within the range $$-\frac{T_u}{24}$$

to $$\frac{T_u}{24}.$$

When the delay spread falls outside the range $$-\frac{T_u}{24}$$

to $$\frac{T_u}{24},$$

it is necessary to interpolate in the time direction.

Similarly, if the Doppler frequency exceeds $$\frac{1}{8T_S},$$

where $T_S$ is the total symbol duration, then interpolation in the time axis will cause aliasing and, as a result, the channel estimation will be inaccurate.

Whether to interpolate at the first stage in the time domain or in the frequency domain will depend on a number of factors including the delay spread and/or the Doppler frequency. Essentially, the higher the Doppler frequency, the more inaccurate will be the interpolation in the time axis and the higher the delay spread, the more inaccurate will be the interpolation in the frequency axis.

With the presence of additive noise on the received signal, the performance of the receiver can be improved by filtering the pilots to remove the noise.

FIG. 2 shows a set of pilot tones that may be used to perform filtering in the frequency axis for the purposes of reducing noise, and FIG. 3 shows a set of pilot tones that may be used to perform filtering in the time axis. In each figure, the pilot tones used to perform filtering are shown by a dot overlaid with a shaded rectangle. If the noise on the pilots occupies the Nyquist bandwidth $f_{Ny}$ and the noise on the filtered pilots occupies an effective noise bandwidth BW, then the noise power is reduced by:

$$10\log_{10}\left(\frac{BW}{f_{Ny}}\right) dB$$

The noise may be reduced further by performing interpolation by four in the time axis before performing noise reduction filtering in the frequency axis, or by performing interpolation by four in the frequency axis before performing noise reduction filtering in the time axis. One particularly good arrangement of the prior art (as long as the Doppler frequency is not too high) is to perform interpolation by four in the time axis, to perform noise reduction filtering in the frequency axis and then to interpolate by 3 in the frequency axis. The noise on the virtual pilots generated by the interpolation in one axis occupies the Nyquist bandwidth which is now $4f_{Ny}$, (because of the interpolation by a factor 4) so if the virtual pilots are filtering to an effective noise bandwidth BW, then the noise power is reduced by:

$$10\log_{10}\left(\frac{BW}{4f_{Ny}}\right) dB$$

Like in FIG. 1, in FIGS. 2 and 3, time is shown on the y-axis and frequency is shown on the x-axis. In FIG. 2, those sub-carriers overlaid with a shaded rectangle are the inputs to an m-tap filter in the frequency direction (here m=6). Similarly, in FIG. 3, those sub-carriers overlaid with a shaded rectangle are the inputs to an m-tap filter in the frequency direction (here m=6). A generic filter for the procedure is shown schematically in FIG. 4. In FIG. 4, the filter coefficients are defined as $h_0$ to $h_{m-1}$. For reducing Gaussian noise, the filter is most likely a low-pass filter. In general, the larger m, the better the filter performance but the more memory is required.

In a practical receiver, the cost of implementing the filters described above, must be considered. In general, the cost of implementing a filter along the frequency axis is lower than the cost of implementing a filter along the time axis. This is because the set of data points required for filtering in the frequency direction are all present in the memory after a symbol has been Fast Fourier Transform-ed (FFT'd) from the time domain to the frequency domain. So, no extra memory space is required in order for the filtering to be performed. In contrast, to apply a filter in the time axis, pilot data from historical symbols must be stored to provide the set of data points required for filtering, and symbol data must also be stored to balance the delay in pilot processing to ensure that symbols for demodulation are time-aligned with the filtered pilots used to equalise the received data. Or putting it another way, the FIG. 3 inputs to the m-tap filter are spread out over time so must be buffered before the filter output can be obtained. But the FIG. 2 filter inputs are all contained on a single symbol.

The cost of implementing a system that interpolates by four in the frequency axis and then performs noise reduction filtering in the time axis will be very high because either the interpolated virtual pilots must be stored for a number of symbols (for example 16 symbols as shown in FIG. 3), or the virtual pilots must be calculated for a number of symbols (for example 16 symbols as shown in FIG. 3) when the noise reduction filtering for one symbol is performed.

The cost of implementing a system that interpolates by four in the time axis and then performs noise reduction filtering in the frequency axis will be rather lower because it is only necessary to calculate and store those virtual pilots that appear in the symbol that is being demodulated. This approach is advantageous in implementation cost, but it cannot work well if the Doppler frequency is so high that time interpolation is inaccurate.

The instantaneous channel impulse response can be estimated and used to derived a Wiener filter for frequency axis filtering. The Doppler spectrum can also be estimated allowing a Wiener filter to be constructed for time axis filtering. However, apart from the difficulty of estimating these parameters, there are other constraints on the maximum order of these filters and hence the amount of noise attenuation that can be achieved.

Firstly, for frequency axis filtering, the maximum order (m) of the frequency axis filter is constrained by the number of sub-carriers k in the symbol and the difficulty associated at the symbols' upper and lower frequencies (where no further pilot sub-carriers exist). High order frequency axis filters are also detrimental when narrow-band interferers are present. The filtering operation causes the interference to be spread across frequency into otherwise unaffected adjacent sub-carriers i.e. the filtering actually increases the amount of interference present.

Secondly, as already suggested, for time axis filtering, the maximum order of the time-axis filter is constrained primarily by the memory available in the receiver to buffer symbols and implement a causal filter. More memory allows a higher order filter (higher m), but is costly in terms of die area, power consumption and latency.

Some prior art systems filter in the time axis and then filter in the frequency axis, or vice-versa, but this requires a large amount of memory space and processing time.

It is an object of the invention to provide a method and apparatus which avoids or mitigates the problems of known systems described above.

SUMMARY OF THE INVENTION

According to a first aspect of the invention, there is provided a method for filtering a received OFDM (Orthogonal Frequency Division Multiplexed) signal to reduce noise, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, the method comprising the step of: producing a filtered version of a selected pilot sub-carrier to be used in subsequent interpolation, by inputting into respective taps of an m-tap filter, m pilot sub-carriers surrounding the selected pilot sub-carrier, the m pilot sub-carriers each satisfying a relationship between n and k, the relationship defining a diagonal line in the n-k plane.

Because the relationship defines a diagonal in the n-k plane, the filtering spans both the frequency and time domain. This has been found to produce improved results, for less memory space. Each pilot sub-carrier entered into the m-tap filter satisfies the n-k relationship. Because that relationship defines a diagonal in the n-k plane, the m pilot sub-carriers "surround" the selected pilot sub-carrier along that diagonal line. Preferably, the pilot sub-carriers surround the selected pilot sub-carrier symmetrically i.e. with the same number of pilots either side of the selected pilot.

The method may further comprise the steps of: repeating the step of producing a filtered version of a selected pilot sub-carrier for a plurality of pilot sub-carriers; and interpolating the OFDM signal using the plurality of the filtered selected pilot sub-carriers.

By performing the interpolation after the noise has been reduced, the resulting interpolation will be more accurate. The interpolation may be used in a receiver for channel estimation, so a more accurate interpolation will increase accuracy of the channel estimation and hence increase accuracy of the recovered transmitted signal.

The step of interpolating may further use at least one unfiltered pilot sub-carrier. Ideally, all the pilot sub-carriers would be able to be filtered. However, for the pilot sub-carriers at the edges of the n-k plane, there are not sufficient surrounding pilot sub-carriers to be used as sensible filter inputs. Thus, the interpolation may use some filtered pilot sub-carriers (near the centre of the n-k plane) and some unfiltered pilot sub-carriers (near the edges of the n-k plane).

In one embodiment, the step of interpolating comprises interpolating by a factor a/b in the frequency direction. This interpolation will produce a set of sub-carriers at every b-th sub-carrier over every symbol i.e. parallel lines in the time direction (spaced apart by b sub-carriers in the frequency direction). In that embodiment, the step of interpolating may further comprise interpolating by a factor b in the frequency direction after interpolating by a factor a/b in the frequency direction. This interpolation will produce the entire set of sub-carriers in the n-k plane.

In an alternative embodiment, the step of interpolating comprises interpolating by a factor a/b in the time direction. This interpolation will produce a set of sub-carriers at every b-th sub-carrier over every symbol i.e. parallel lines in the time direction (spaced apart by b sub-carriers in the frequency direction). In that embodiment, the step of interpolating may further comprise interpolating by a factor b in the frequency direction after interpolating by a factor a/b in the time direction. This interpolation will produce the entire set of sub-carriers in the n-k plane.

Interpolating after filtering has been described above. However, it is possible to partially or fully interpolate before filtering although many such schemes are inefficient.

Thus, the method may further comprise the steps of: interpolating the OFDM signal before the filtering, using the plurality of pilot sub-carriers; repeating the step of producing a filtered version of a selected pilot sub-carrier for a plurality of pilot sub-carriers; and interpolating, after the filtering, using the plurality of the filtered selected pilot sub-carriers.

Preferably, the step of interpolating before the filtering comprises interpolating by a factor a/b in the time direction. Alternatively, the step of interpolating before the filtering may comprise interpolating by a factor a/b in the frequency direction.

Preferably, the step of interpolating after the filtering comprises interpolating by a factor b in the frequency direction.

Or the method may further comprise the steps of: interpolating the OFDM signal before the filtering, using the plurality of pilot sub-carriers; and repeating the step of producing a filtered version of the a selected pilot sub-carrier for a plurality of pilot sub-carriers.

However, in a preferred embodiment the step of interpolating comprises interpolating (after the filtering) by a factor 12 in the frequency direction. This is particularly advantageous since no extra memory buffering is required and the diagonal filtering can be performed by a filter having a large number of taps.

In another favoured embodiment, the step of interpolating comprises interpolating (after the filtering) by a factor 4 in the time direction then interpolating by a factor 3 in the frequency direction.

Preferably, the step of interpolating is performed by a multi-rate polyphase filter.

Preferably, the relationship between n and k defines a diagonal in the n-k plane which has the highest ratio of pilot sub-carriers to non-pilot sub-carriers of any diagonal. In that case, the sampling rate will be the highest effective sampling rate of any diagonal and the filtering will be the most accurate.

In one embodiment, the relationship between n and k is given by:

$k - b \cdot n = aD,$ where D is an integer.

In one embodiment, a=12 and b=3. These values are those used in the standard TV systems, DVB-T, DVB-H and ISDB-T.

The number of taps m on the filter may be any number, but the larger the number of taps, the better the performance but the larger the memory required for the system. Preferred embodiments of the invention use four six or eight taps for interpolation by four in the time axis, sixteen taps for interpolation by four in the frequency axis, fifteen taps for noise reduction filtering in the frequency axis and fifteen taps for noise reduction filtering in the diagonal axis.

Preferably, the step of producing a filtered version of a selected pilot sub-carrier is performed by a Wiener filter which is matched to the relative levels of signal and noise in the pilot sub-carriers. In many cases a Wiener filter may be approximated by a low-pass filter.

According to a second aspect of the invention, there is provided a computer program which, when run on computer means, causes the computer means to carry out the method of the first aspect of the invention.

According to the second aspect of the invention, there is also provided a record carrier having stored thereon a computer program according to the second aspect of the invention.

According to the second aspect of the invention, there is also provided a computer program which, when run on computing means for filtering a received OFDM (Orthogonal Frequency Division Multiplexed) signal to reduce noise, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, causes the computer means to carry out the steps of: a) filtering a selected pilot sub-carrier, by inputting into respective taps of an m-tap filter, m pilot sub-carriers surrounding the selected pilot sub-carrier, the m pilot sub-carriers each satisfying a relationship between n and k, the relationship defining a diagonal line in the n-k plane; b) repeating step a) for a plurality of pilot sub-carriers; and c) interpolating, in the time dimension or in the frequency dimension, using the plurality of filtered selected pilot sub-carriers from step b).

According to a third aspect of the invention, there is provided apparatus for filtering an OFDM (Orthogonal Frequency Division Multiplexed) signal to reduce noise, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, the apparatus comprising: an m-tap filter for filtering a selected pilot sub-carrier to be used in subsequent interpolation, the filter being arranged to receive m pilot sub-carriers, into the respective m taps, surrounding the selected pilot sub-carrier, the m pilot sub-carriers each satisfying a relationship between n and k, the relationship defining a diagonal line in the n-k plane.

The apparatus may further comprise a plurality of m-tap filters for producing filtered versions of a plurality of selected pilot sub-carriers. The resulting filter will produce a set of filtered pilot sub-carriers which can be used together for more accurate subsequent interpolation.

Preferably, the apparatus further comprises an interpolator for interpolating the OFDM signal using the plurality of filtered selected pilot sub-carriers.

The interpolator may use at least one unfiltered pilot sub-carrier. Ideally, all the pilot sub-carriers would be able to be filtered. However, for the pilot sub-carriers at the edges of the n-k plane, there are not sufficient surrounding pilot sub-carriers to be used as sensible filter inputs. Thus, the interpolation may use some filtered pilot sub-carriers as well as some unfiltered pilot sub-carriers.

In one embodiment, the interpolator is arranged to interpolate by a factor a/b in the frequency direction. Such an interpolator will produce a set of sub-carriers at every b-th sub-carrier over every symbol i.e. parallel lines in the time direction (spaced apart by b sub-carriers in the frequency direction). In that embodiment, the interpolator may be further arranged to interpolate by a factor b in the frequency direction after interpolating by a factor a/b in the frequency direction. This subsequent interpolation will produce the entire set of sub-carriers in the n-k plane.

In an alternative embodiment, the interpolator is arranged to interpolate by a factor a/b in the time direction. Such an interpolator will produce a set of sub-carriers at every b-th sub-carrier over every symbol i.e. parallel lines in the time direction (spaced apart by b sub-carriers in the frequency direction). In that embodiment, the interpolator may be further arranged to interpolate by a factor b in the frequency direction after interpolating by a factor a/b in the time direction. This subsequent interpolation will produce the entire set of sub-carriers in the n-k plane.

The apparatus described above in relation to the third aspect of the invention, has been described as a filter followed by an interpolator which may interpolate in the frequency dimension followed by the frequency dimension or in the time dimension followed by the frequency dimension, to produce a full set of sub-carriers for channel estimation. Such an interpolator may be implemented as a single interpolator or two or more separate interpolators.

Alternatively, however, some or all the interpolating can be done before the filtering. Thus, the apparatus may comprise a first interpolator for interpolating the OFDM signal before filtering, a plurality of m-tap filters for producing filtered versions of a plurality of selected pilot sub-carriers, and a second interpolator for interpolating the OFDM signal using the plurality of filtered selected pilot sub-carriers. Or, the apparatus may comprises an interpolator for interpolating the OFDM signal before filtering and a plurality of m-tap filters for producing filtered versions of a plurality of selected pilot sub-carriers.

In a preferred arrangement, however, the apparatus comprises an interpolator arranged to interpolate (after the filtering) by a factor 12 in the frequency direction. In another favoured embodiment, the apparatus comprises an interpolator arranged to interpolate (after the filtering) by a factor 4 in the time direction and then by a factor 3 in the frequency direction.

Preferably, the interpolator is a multi-rate polyphase filter.

Preferably, the relationship between n and k defines a diagonal in the n-k plane which has the highest ratio of pilot sub-carriers to non-pilot sub-carriers of any diagonal.

In one embodiment, the relationship between n and k is given by:

$$k-b \cdot n = aD,$$

where D is an integer.

Preferably, a=12 and b=3. These values are those used in the standard TV systems, DVB-T, DVB-H and ISDB-T.

The number of taps m on the filter may be any number, but the larger the number of taps, the better the performance but the larger the memory required for the system. Preferred embodiments of the invention use fifteen taps on the diagonal filter for a system arranged to use four taps on a time interpolation filter, or in general 4·n−1 taps on the diagonal filter for a system arranged to use n taps on a time interpolation filter.

Preferably, the filter comprises a Wiener filter which is matched to the relative levels of signal and noise in the pilot sub-carriers. The Wiener filter may be approximated by a low-pass filter.

The apparatus may be a receiver for OFDM signals. The receiver for OFDM signals may be a mobile television receiver.

According to the third aspect of the invention, there is also provided a receiver for receiving an OFDM (Orthogonal Frequency Division Multiplexed) signal, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, the apparatus comprising: a plurality of m-tap filters to produce filtered versions of a plurality of selected pilot sub-carriers, each filter being arranged to receive m pilot sub-carriers, into the respective m taps, surrounding the selected pilot sub-carrier, the m pilot sub-carriers each satisfying a relationship between n and k, the relationship defining a diagonal line in the n-k plane; an interpolator for interpolating the OFDM signal using the plurality of filtered selected pilot sub-carriers; and a demodulator for deriving the originally transmitted signal from the interpolated sub-carriers.

Aspects described in relation to one aspect of the invention may also be applicable to another aspect of the invention.

BRIEF DESCRIPTION OF THE DRAWINGS

Existing systems have already been described with reference to FIGS. 1 to 4, of which:

FIG. 4 is a schematic diagram of an m-tap filter. An embodiment of the invention will now be described with reference to the remaining figures, of which:

DETAILED DESCRIPTION OF A PREFERRED EMBODIMENT

Figure 5:
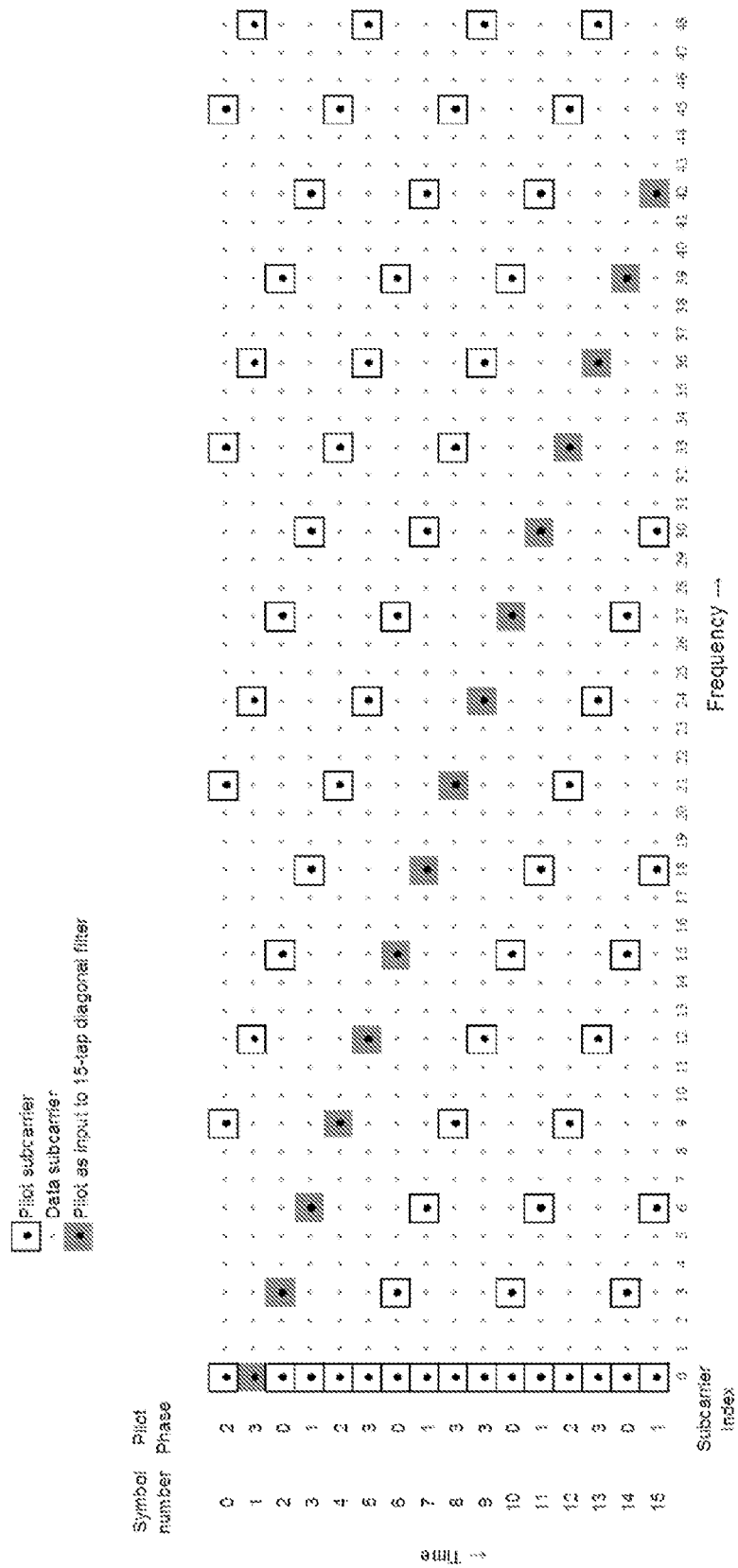
FIG. 5 is a 2D frequency-time plot showing filtering of the scattered pilots according to an embodiment of the invention.

FIG. 5 is a frequency time plot showing filtering performed by the filter along the pilot diagonals according to an embodiment of the invention. This is filtering in a domain which spans both the time and frequency directions.

This diagonal filtering enables the reduction of noise on the estimated channel response in certain channel conditions using less memory than alternative techniques. When the channel delay spread lies within the range $$-\frac{T_u}{24}$$

to $$\frac{T_u}{24},$$

so that interpolation of the scattered pilots in the frequency direction can be performed as the first stage of interpolation, the diagonal filtering gives excellent results for a low implementation cost. On the other hand, when the channel delay spread lies outside $$-\frac{T_u}{24}$$

to $$\frac{T_u}{24},$$

so that interpolation of the scattered pilots must be performed in the time direction as the first stage of interpolation, the diagonal filtering also gives excellent results for a low implementation cost.

Figure 2:
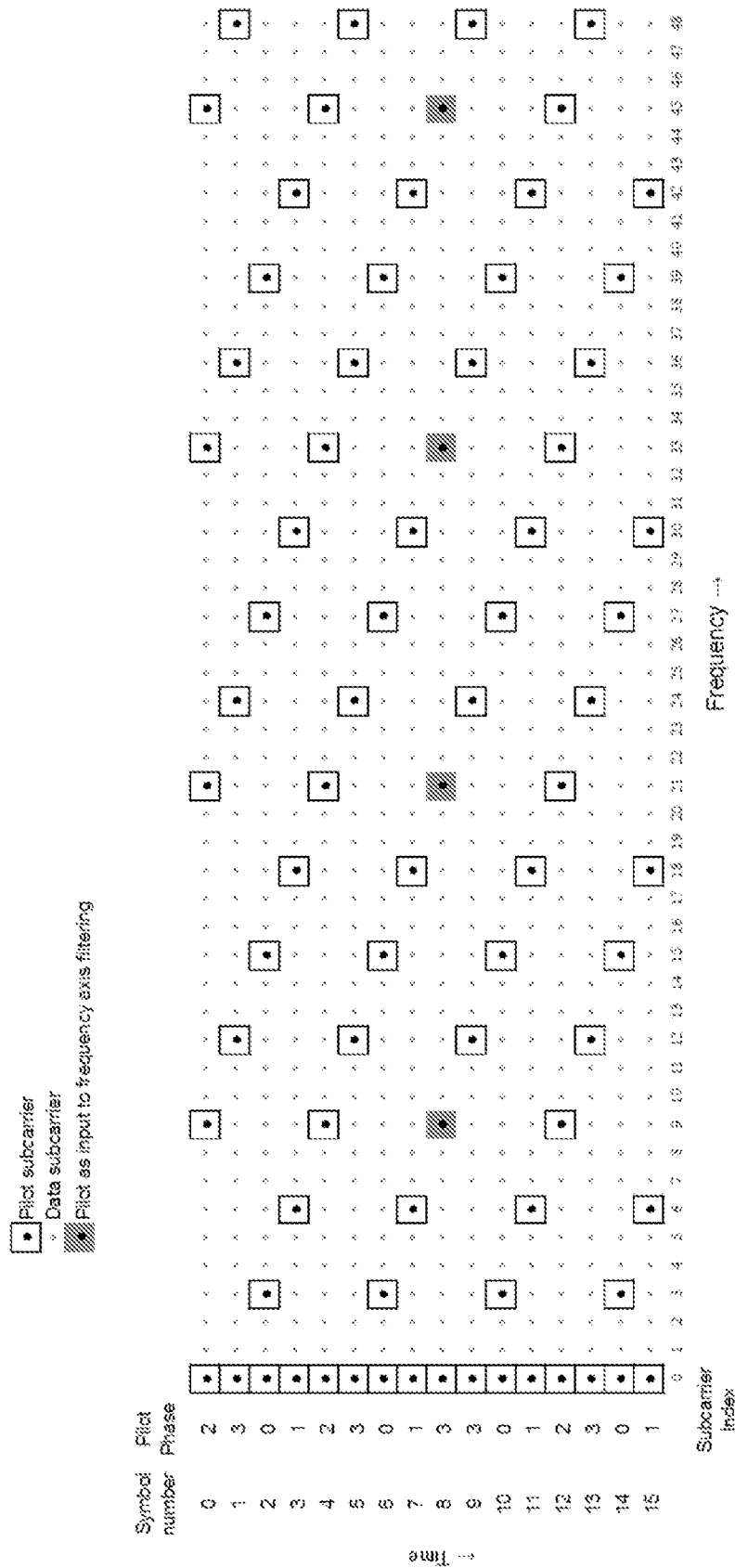
FIG. 2 is a 2D frequency-time plot showing filtering of the scattered pilots in the frequency direction.

A general description of the diagonal filtering follows. In the frequency axis pilot filtering of FIG. 2, the inputs to the m-tap filter of FIG. 4 were the pilot sub-carriers for a number of sub-carriers for a particular symbol. That is, the pilot sub-carriers to be input into the filter are selected by fixing the symbol number and varying the sub-carrier number. (In the FIG. 2 example, k=12D and there were six pilot sub-carriers in symbol index 12 i.e. $p_{12,0}$, $p_{12,0}$, $p_{12,12}$, $p_{12,24}$, $p_{12,36}$, $p_{12,48}$ and $p_{12,60}$.)

Figure 3:
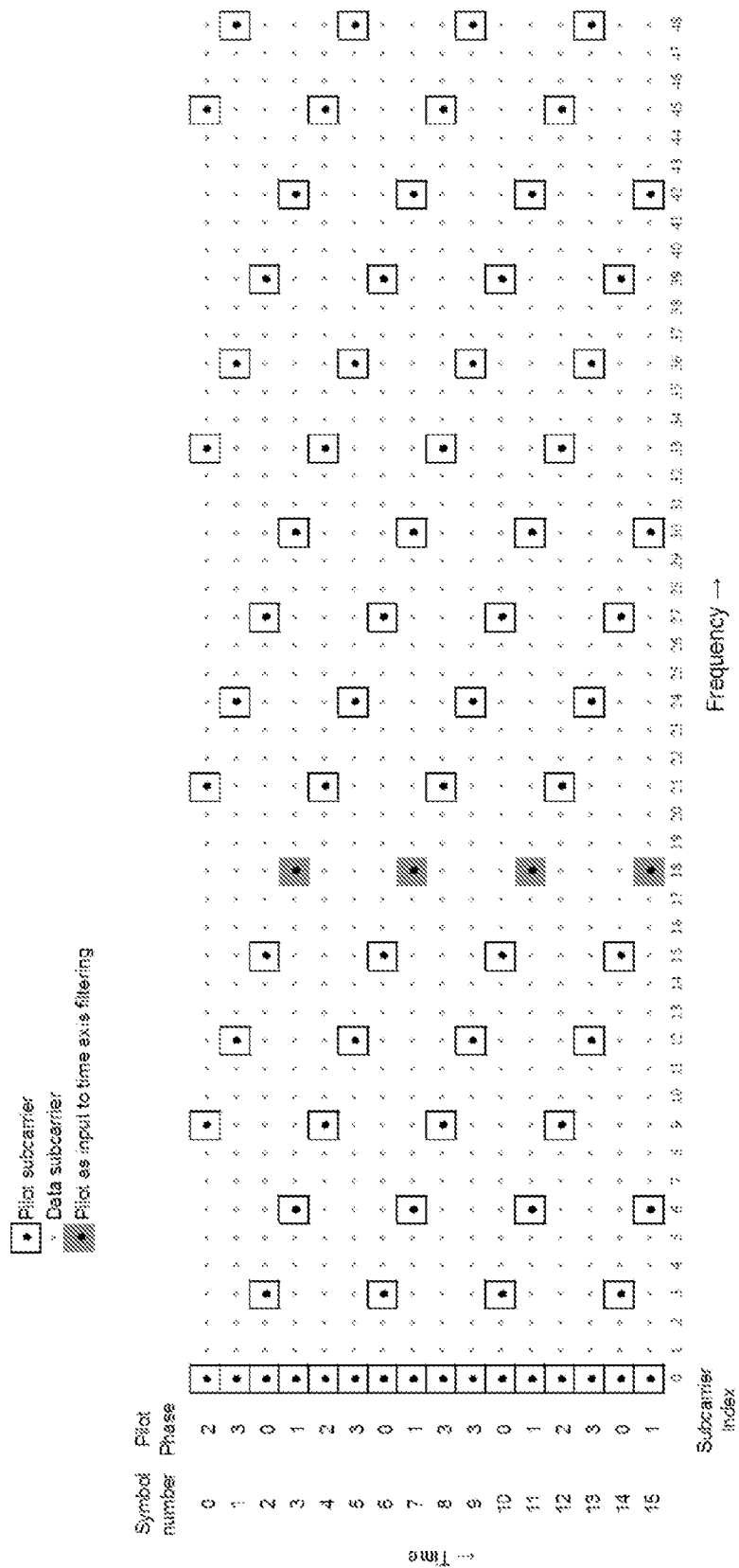
FIG. 3 is a 2D frequency-time plot showing filtering of the scattered pilots in the time direction.
Figure 4:
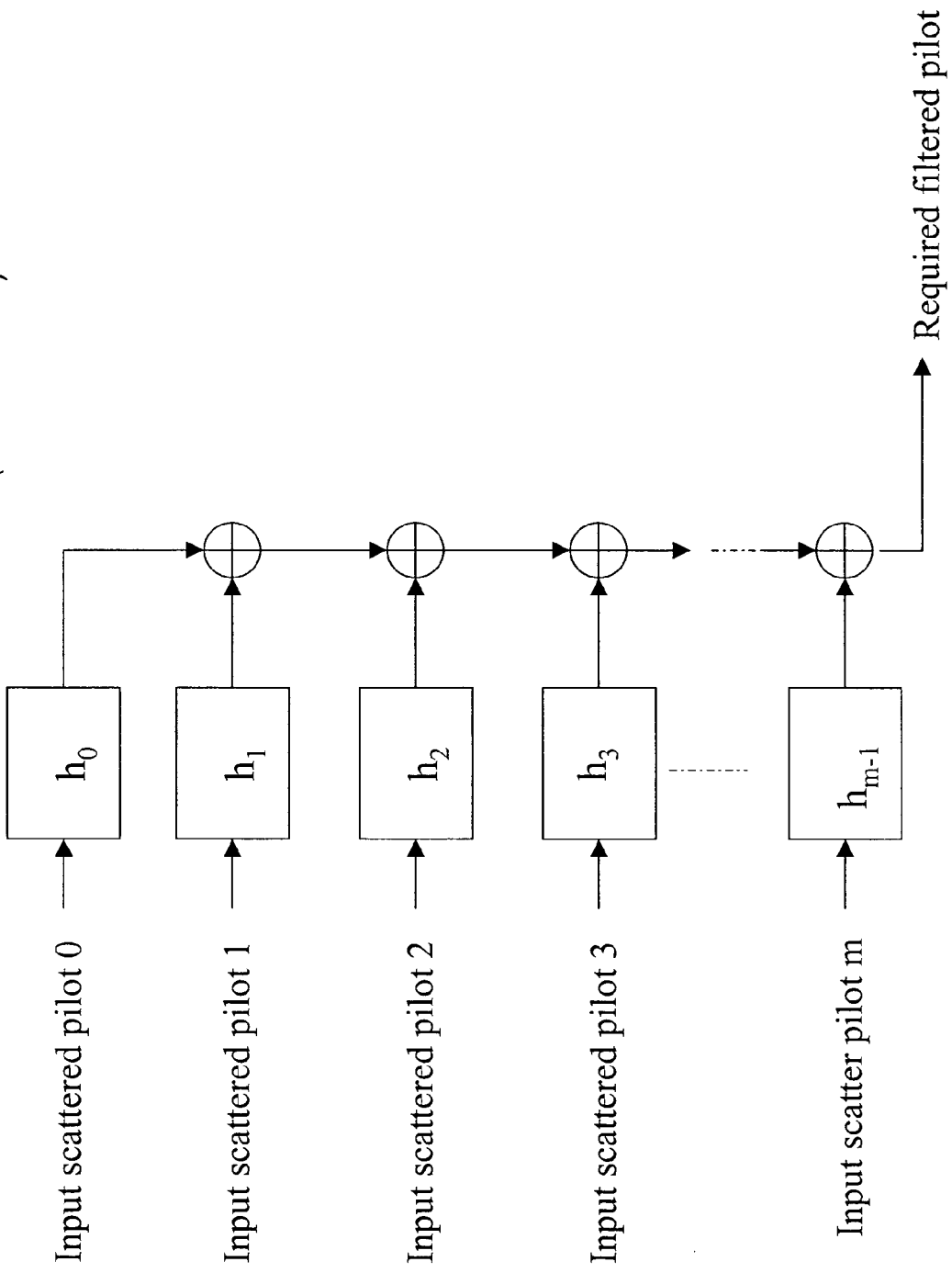

In contrast, in the time axis pilot filtering of FIG. 3, the inputs to the m-tap filter of FIG. 4 were the pilot sub-carriers at a particular sub-carrier over a number of symbols. That is, the pilot sub-carriers to be input into the filter are selected by fixing the sub-carrier number and varying the symbol number. (In the FIG. 3 example, n=4D and there were six pilot sub-carriers in sub-carrier index 33 i.e. $p_{3,33}$, $p_{7,33}$, $p_{11,33}$, $p_{15,33}$, $p_{19,33}$ and $p_{23,33}$.)

In the diagonal filtering according to an embodiment of the invention, the pilot sub-carriers for inputting into the filter are selected by neither fixing the symbol number nor the sub-carrier number, but by defining a relationship between the two. Such a relationship will define a diagonal in the sub-carrier/symbol plane. Pilot sub-carriers which satisfy that relationship are used as inputs into the filter.

Figure 1:
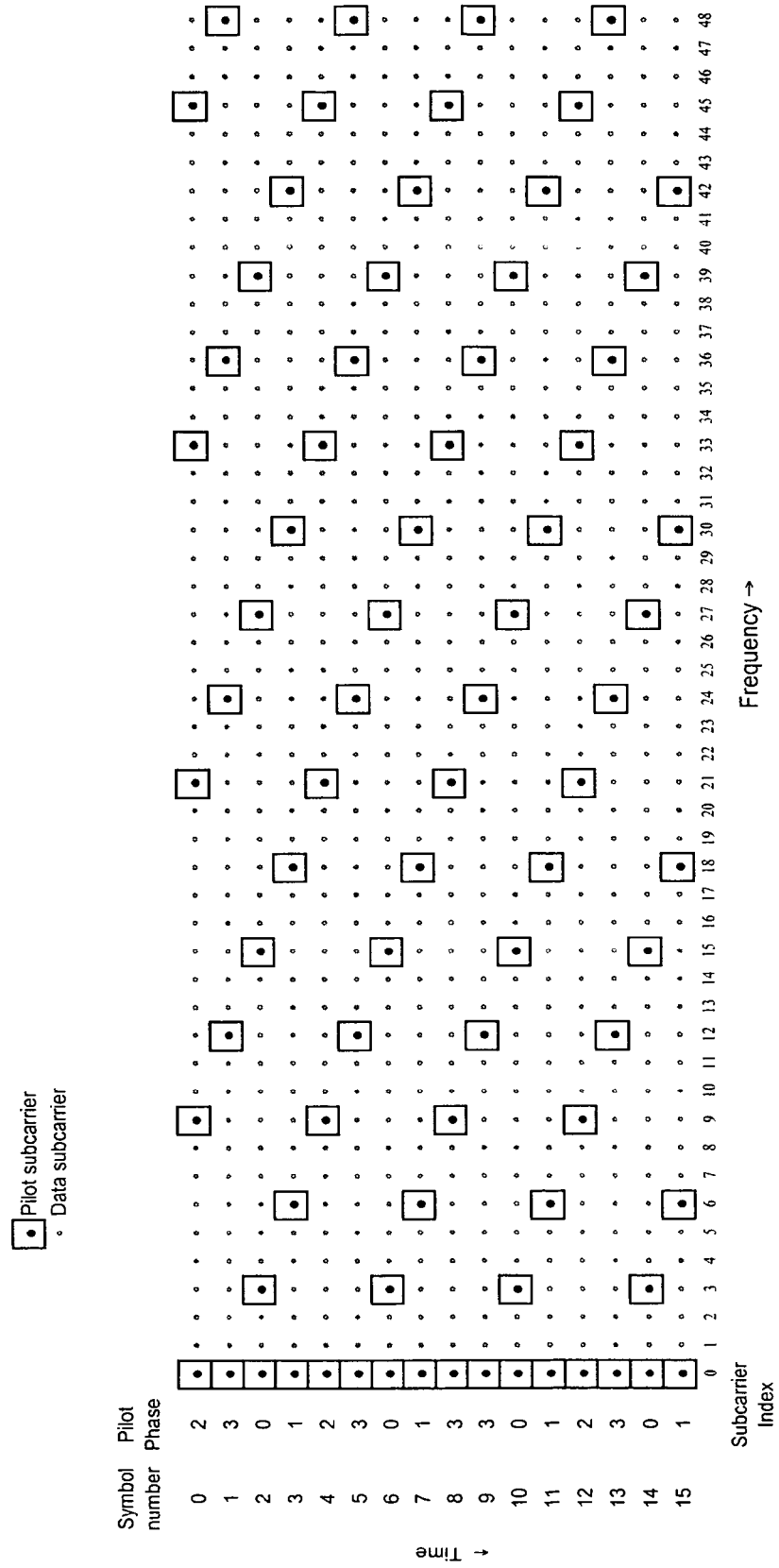
FIG. 1 is a 2D frequency-time plot showing scattered pilot sub-carriers for a number of digital TV OFDM transmission systems.

The scattered pilot sub-carriers in FIG. 1 correspond to those sub-carriers for which k and n satisfy:

$$k-3 \cdot n = 12D \quad (1)$$

Each diagonal line of scattered pilots (like the one shown in FIG. 5) takes a different value of D.

Note that the following example uses the relationship given in Equation (1). However, the sub-carrier spacing of the pilots in each symbol does not need to be 12 (although this is what is used in the TV standards DVB-T, DVB-H and ISBD-T). Also, the pilot shift between adjacent symbols does not need to be 3 (although, again, this is what is used in DVB-T, DVB-H and ISBD-T). In general, for a pilot sub-carrier spacing across each symbol of a and a shift between adjacent symbols of b, Equation (1) becomes:

$$k - b \cdot n = aD$$

Also note that the diagonal filtering does not need to be performed in the particular diagonals shown in FIG. 5 (although these are found to be particularly advantageous, as will be discussed in more detail below). The filtering could be performed in any diagonal lines (i.e. where neither the sub-carrier index k nor the symbol index n are constant). All that is required is for a particular relationship between n and k to be defined and the filter inputs to be the pilot sub-carriers which satisfy that relationship.

The mathematical analysis of the signal will now be considered.

An OFDM signal can be described in the frequency domain as a set of sub-carriers, each of which is independently modulated by a complex value. (It is those complex values that are estimated in the receiver in order to demodulate successfully.) The complex value transmitted on sub-carrier k of symbol n is designated as $X_{n,k}$ and the complex value received on sub-carrier k of symbol n is designated as $Y_{n,k}$.

As discussed above, the scattered pilots shown in FIG. 1 correspond to those sub-carriers for which k and n satisfy:

$$k - 3 \cdot n = 12D \qquad (1)$$

The fading radio channel may be represented in the time domain as:

$$y(t) = \sum_m \sum_l x(t - \tau_m) \cdot a_m \cdot \exp(j2\pi f_{m,l}(t - \tau_m) + \phi_{m,l}) \qquad (2)$$

where x(t) is the undistorted transmitted signal,
$\alpha_m$ defines the amplitude of tap m in the multi-tap channel model,
$\tau_m$ defines the delay of tap m, and
$f_{m,l}$ and $\phi_{m,l}$ define the frequency and phase of one component of the complex fading spectrum.

Equation (2) makes use of the Jakes Doppler spectrum (i.e. effectively assigns a Doppler spectrum defined by $f_{m,l}$ and $\phi_{m,l}$ to each of the m taps because the channel is a fading channel) and l is the index of the Jakes Doppler spectrum components (so the summation over l takes account of the Doppler shift for each tap).

The fading channel of Equation (2) can be expressed in the frequency domain by applying a Fast Fourier Transform (FFT) to the signal y(t). This gives $$Y_{n,k} = \sum_{t=0}^{(N-1)T} y(nT_S + t) \exp(-j2\pi kt/NT) \qquad (3)$$

where n is the symbol number,
T is the duration of one sample, and
$T_S$ is the duration of a symbol.
From Equation (2):

$$y(nT_S + t) = \sum_m \sum_l x(nT_S + t - \tau_m) a_m \exp(j2\pi f_{m,l}(nT_S + t - \tau_m) + \phi_{m,l})$$

so that Equation (3) becomes:

$$Y_{n,k} = \sum_{t=0}^{(N-1)T} \sum_m \sum_l x(nT_S + t - \tau_m) \cdot a_m \cdot \qquad (4)$$
$$\exp(j2\pi f_{m,l}(nT_S + t - \tau_m) + \phi_{m,l}) \cdot \exp(-j2\pi kt/NT)$$

Equation (4) is an entirely accurate description of the signal and the portion $\exp(j2\pi f_{m,l}(nT_S+t-\tau_m)+\phi_{m,l})$ of Equation (4) describes the time-varying channel. If we make an approximation and replace $nT_S+t-\tau_m$ with $nT_S-\tau_m=t'$ i.e. set t=0 (discussed below), we have from Equation (4):

$$Y_{n,k} =$$
$$\sum_{t=0}^{(N-1)T} \sum_m \sum_l x(nT_S + t - \tau_m) \cdot a_m \cdot \exp(j2\pi f_{m,l}t' + \phi_{m,l}) \cdot \exp(-j2\pi kt/NT)$$

The portion $$\sum_{t=0}^{(N-1)T} x(nT_S + t - \tau_m) \cdot \exp(-j2\pi kt/NT)$$

is just the FFT'd x i.e. $X_{n,k}$, multiplied by $\exp(-\tau_m j2\pi k/NT)$, so we have:

$$Y_{n,k} = \sum_m \sum_l X_{n,k} \exp(-\tau_m j2\pi k/NT) \cdot a_m \cdot \exp(j2\pi f_{m,l}t' + \phi_{m,l})$$

which gives us:

$$Y_{n,k} = X_{n,k} \sum_m \sum_l a_m \cdot \exp\left(j2\pi\left(f_{m,l}t' - \frac{\tau_m k}{NT}\right) + \phi_{m,l}\right) \qquad (5)$$

Changing $nT_S+t-\tau_m$ to $nT_S-\tau_m=t'$ fixes the phase of each tap of the fading channel for the duration of each symbol. Because the phase is fixed for the duration of a symbol, Equation (5) does not describe the inter-carrier interference (ICI) that is generated by the fading channel. However, this simplification is valid, since diagonal filtering provides an improvement in demodulation performance whether the ICI is present or not. We can therefore use Equation (5) as a reference for describing the operation of diagonal filtering.

Thus, Equation (5) describes a received signal $Y_{n,k}$ that is the transmitted signal $X_{n,k}$ modulated by a set of time-frequency components $$\exp\left(j2\pi\left(f_{m,l}t' - \frac{\tau_m k}{NT}\right) + \phi_{m,l}\right).$$

When the received pilot sub-carriers are filtered to attenuate noise, it is important that the filter passes all of the time/frequency components with fidelity sufficient to give good demodulation performance. If the level of noise and the spectrum of time/frequency components is known, a Wiener filter can be designed to give the best possible signal-to-noise ratio (SNR) at the filter output.

If the set of wanted time/frequency components are evenly distributed over a defined range of frequencies, then the noise attenuation achieved by a Wiener filter is given by:

$$atten = -10\log_{10}\left(\frac{BW_d}{f_{Ny}}\right) dB \quad (6)$$

where $BW_d$ is the desired signal bandwidth and $f_{Ny}$ is the Nyquist frequency for the sampled data set.

From Equation (5), the phase $\Theta$ of each time/frequency component of the fading channel such that $$\exp\left(j2\pi\left(f_{m,l}t' - \frac{\tau_m k}{NT}\right) + \phi_{m,l}\right) = \exp(j\Theta)$$

is given by:

$$\Theta_{n,k,m,l} = 2\pi\left(f_{m,l}(nT_S - \tau_m) - \frac{\tau_m k}{NT}\right) + \phi_{m,l} \quad (7)$$

The ratio $$\frac{BW_d}{f_{Ny}}$$

from Equation (6) is equal to $$\frac{1}{\pi}$$

multiplied by the maximum change in phase between two successive samples for all values of m and l. We will assume that the time axis components of Equation (7) are evenly distributed across a range such that $-\tau_{max} \leq \tau_m \leq \tau_{max}$. We further assume that the frequency axis components of Equation (7) are evenly distributed across a range such that $-f_{max} \leq f_{m,l} \leq f_{max}$.

Given these assumptions, we can calculate the noise attenuation for the three cases of 1) filtering in the frequency direction (prior art), 2) filtering in the time direction (prior art) and 3) diagonal filtering (the invention). We can then compare them.

1) For Frequency Axis Filtering where k=12D:
In equation (7), we set n=1 and k=12 to give:

$$\Theta_{1,12,m,l} = 2\pi\left(f_{m,l}(T_S - \tau_m) - \frac{\tau_m 12}{NT}\right) + \phi_{m,l}$$

and we set n=1 and k=24 to give:

$$\Theta_{1,24,m,l} = 2\pi\left(f_{m,l}(T_S - \tau_m) - \frac{\tau_m 24}{NT}\right) + \phi_{m,l}$$

So, the change in phase between successive samples of tap m is $$|\Theta_{1,24,m,l} - \Theta_{1,12,m,l}| = 2\pi\left(\frac{12\tau_m}{NT}\right) = \frac{24\pi\tau_m}{NT}$$

and the maximum change in phase between successive samples for all m and l is $$\max(|\Theta_{1,24,m,l} - \Theta_{1,12,m,l}|) = \frac{24\pi\tau_{max}}{NT}$$

So, $$atten = -\log_{10}\left(\frac{1}{\pi}\max(|\Theta_{1,24,m,l} - \Theta_{1,12,m,l}|)\right)$$

which gives:
For frequency axis filtering:

$$atten = -10\log_{10}\left(\frac{24\tau_{max}}{NT}\right) \quad (8)$$

For Time Axis Filtering where n=4D:
In equation (7), we set n=1 and k=12 to give:

$$\Theta_{1,12,m,l} = 2\pi\left(f_{m,l}(T_S - \tau_m) - \frac{\tau_m 12}{NT}\right) + \phi_{m,l}$$

and we set n=5 and k=12 to give:

$$\Theta_{5,12,m,l} = 2\pi\left(f_{m,l}(5 \cdot T_S - \tau_m) - \frac{\tau_m 12}{NT}\right) + \phi_{m,l}$$

So, the change in phase between successive samples of tap m component l is $$|\Theta_{5,12,m,l} - \Theta_{1,12,m,l}| = 8\pi f_{m,l} T_S$$

and the maximum change in phase between successive samples for all m and l is $$\max(|\Theta_{5,12,m,l} - \Theta_{1,12,m,l}|) = 8\pi f_{max} T_S$$

So, for time axis filtering:

$$atten = -10\log_{10}(8f_{max}T_S) \quad (9)$$

For Diagonal Filtering where k–3·n=12D:
In equation (7), we set n=1 and k=12 to give:

$$\Theta_{1,12,m,l} = 2\pi\left(f_{m,l}(T_S - \tau_m) - \frac{\tau_m 12}{NT}\right) + \phi_{m,l}$$

and we set n=2 and k=15 to give:

$$\Theta_{2,15,m,l} = 2\pi\left(f_{m,l}(2 \cdot T_S - \tau_m) - \frac{\tau_m 15}{NT}\right) + \phi_{m,l}$$

So, the change in phase between successive samples=

$$|\Theta_{2,15,m,l} - \Theta_{1,12,m,l}| = 2\pi f_{m,l}T_S - \frac{6 \cdot \pi \cdot \tau_m}{NT}$$

and the maximum change in phase between successive samples for all m and l is $$\max(|\Theta_{2,15,m,l} - \Theta_{1,12,m,l}|) = 2\pi f_{max}T_S + \frac{6\pi\tau_{max}}{NT}$$

So in summary:
For frequency axis filtering:

$$atten = -10\log_{10}\left(\frac{24\tau_{max}}{NT}\right) \quad (8)$$

For time axis filtering:

$$atten = -10\log_{10}(8f_{max}T_S) \quad (9)$$

and
For diagonal filtering:

$$atten = -10\log_{10}\left(2f_{max}T_S + \frac{6\tau_{max}}{NT}\right) \quad (10)$$

From equations (8), (9) and (10), we see that the diagonal filtering technique of this embodiment of the present invention has much better noise attenuation than the known time axis or frequency axis filtering techniques.

The bandwidth of the wanted signal in the diagonal domain is a function of both the channel impulse response and the Doppler frequency spread as seen at the receiver. The diagonal filter bandwidth can be set either as a Wiener filter matched to the instantaneous bandwidth of the signal in the diagonal, or it can be set to match known channel conditions where the maximum Doppler frequency and delay spread are constrained.

As already discussed, channel estimation in the receiver can be performed either by time axis and then frequency axis interpolation (suitable for wide delay spread) or by frequency axis interpolation (suitable for narrow delay spread).

Two specific examples of the invention will be given below. In Example 1, the interpolation takes place in the frequency domain only. In Example 2, the interpolation takes place in the time domain and then in the frequency domain.

EXAMPLE 1

A specific example of the diagonal filtering as described above will now be described with reference to FIGS. 6 and 7.

This example shows the application of a 15 tap noise reducing diagonal filter to a channel estimator using frequency axis interpolation.

Figure 6:
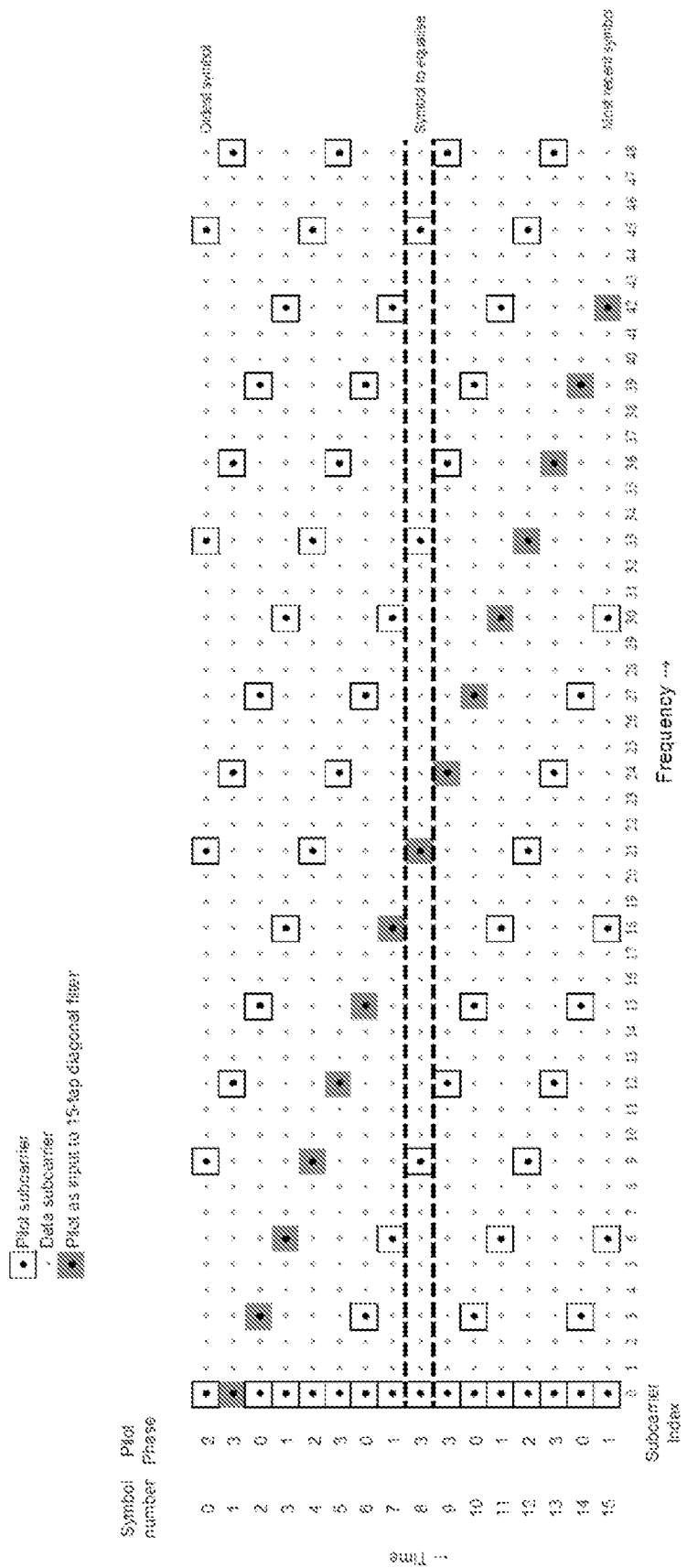
FIG. 6 is a 2D frequency-time plot showing filtering of the scattered pilots before a frequency interpolation.
Figure 7:
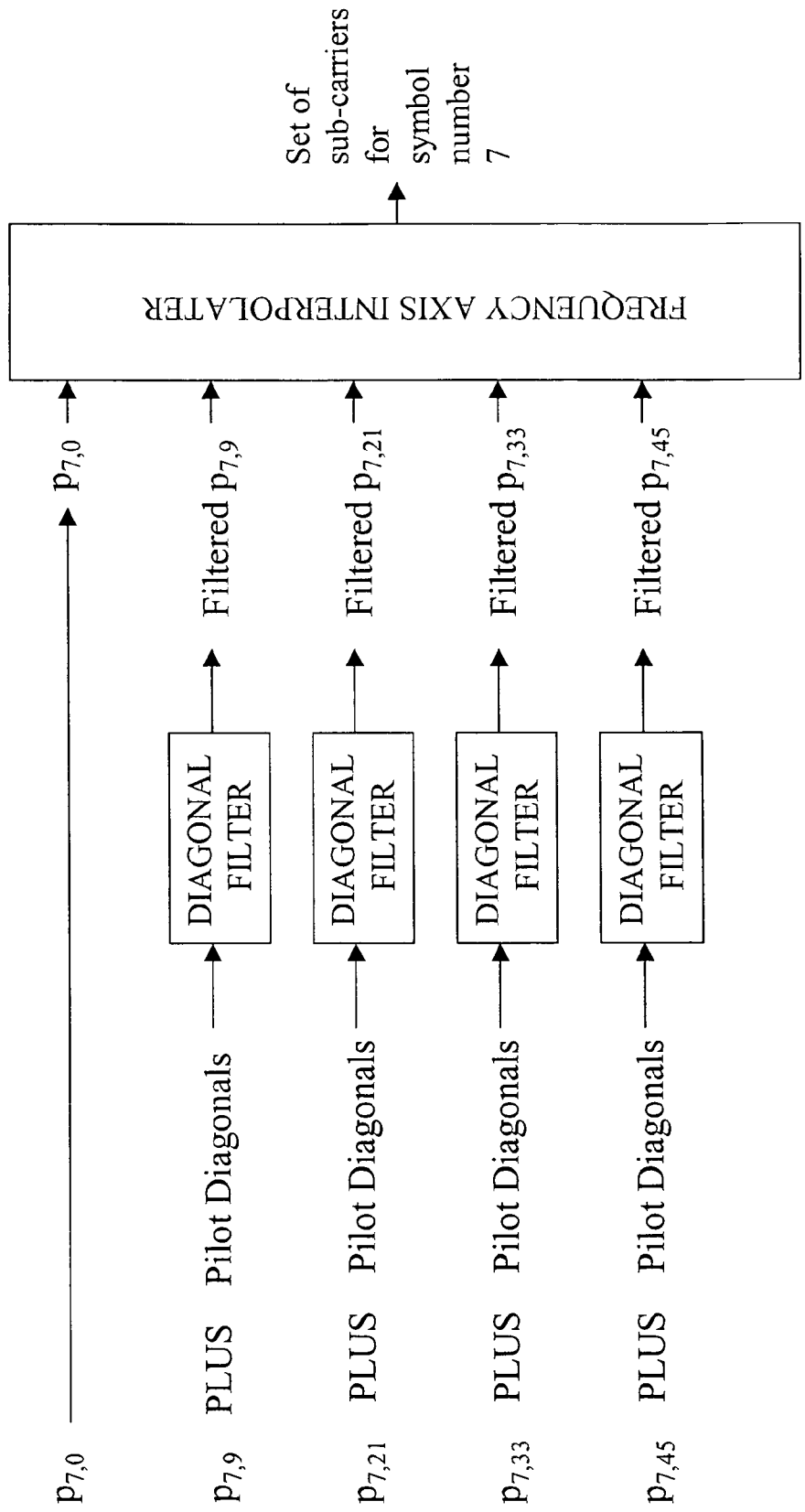
FIG. 7 is a diagram of the apparatus used for the filtering and interpolation shown in FIG. 6.

FIG. 6 shows a subset of the time frequency plane for 16 consecutive OFDM symbols. As in FIGS. 1 to 4, the scattered pilots are highlighted in the diagram. In this example, the channel estimate for symbol number 7 is being estimated (symbol number 0 is the most recently received).

The channel estimation is performed by interpolating by a factor 12 between the scattered pilot sub-carriers (in this case sub-carriers numbered 0, 9, 21, 33, 45 i.e. those scattered pilots falling within symbol 7). The result is a channel estimate for each of the sub carriers i.e. the band at symbol 7 shown by the dotted lines in FIG. 6. This channel estimate is usually a single complex value per sub-carrier and is used by the equalizer to correct for the distortion encountered by the channel.

We could simply use the raw values of the pilots at 0, 9, 21, 33 and 45 to perform the interpolation. But, as already mentioned, it is advantageous to perform filtering to those scattered pilots, before using them for interpolation.

According to the invention, the filtering is carried out along the pilot diagonals i.e. in a domain spanning both time and frequency. This reduces the Gaussian noise on the received pilots before interpolation.

Consider the filtering applied to sub-carrier 21 of symbol 7. FIG. 5 shows (in dark shading) the pilots that are input to one such application of the filter (like that shown in FIG. 4 with m=15) in order to produce a noise reduced channel estimate for sub-carrier 21 of symbol 7. The diagonal filter is applied to produce a noise reduced channel estimate $$\hat{p}_{7,21} = p_{14,0}h_0 + p_{13,3}h_1 + p_{12,6}h_2 + p_{11,9}h_3 + p_{10,12}h_4 + \\ p_{9,15}h_5 + p_{8,18}h_6 + p_{7,21}h_7 + p_{6,24}h_8 + p_{5,27}h_9 + \\ p_{4,30}h_{10} + p_{3,33}h_{11} + p_{2,36}h_{12} + p_{1,39}h_{13} + p_{0,42}h_{14} \quad (13)$$

This noise reduced $\hat{p}_{7,21}$ can be used instead of the noisy $p_{7,21}$ as the input for the interpolation.

Similarly, the other scattered pilots in the symbol number 7 could be filtered. For example:

$$\hat{p}_{7,33} = p_{14,12}h_0 + p_{13,15}h_1 + p_{12,18}h_2 + p_{11,21}h_3 + p_{10,24}h_4 + \\ p_{9,27}h_5 + p_{8,30}h_6 + p_{7,33}h_7 + p_{6,36}h_8 + p_{5,39}h_9 + \\ p_{4,42}h_{10} + p_{3,45}h_{11} + p_{2,48}h_{12} + p_{1,51}h_{13} + p_{0,54}h_{14}$$

The filter would run a similar pattern across the symbol in an increasing frequency direction until noise reduced channel estimates are available for all scattered pilot sub-carriers of symbol 7 with the exception of those at the symbol's upper and lower frequency boundaries. In those cases, there is insufficient pilot information to filter diagonally, so the pilot sub-carriers are used directly rather than after filtering. This may be achieved by adjusting the group delay of the interpolator.

So, the inputs for the interpolation along the frequency direction for symbol 7 would be $p_{7,0}$, $\hat{p}_{7,9}$, $\hat{p}_{7,21}$, $\hat{p}_{7,33}$ and $\hat{p}_{7,45}$. This is shown in FIG. 7. The interpolator is usually implemented as a multi-rate polyphase filter where the bandwidth of the filter can be narrowed to provide some across frequency filtering.

EXAMPLE 2

A second specific example of the diagonal filtering as described above will now be described with reference to FIGS. 8 and 9.

This example shows the application of noise reducing diagonal filter to a channel estimator using time axis interpolation.

Figure 8:
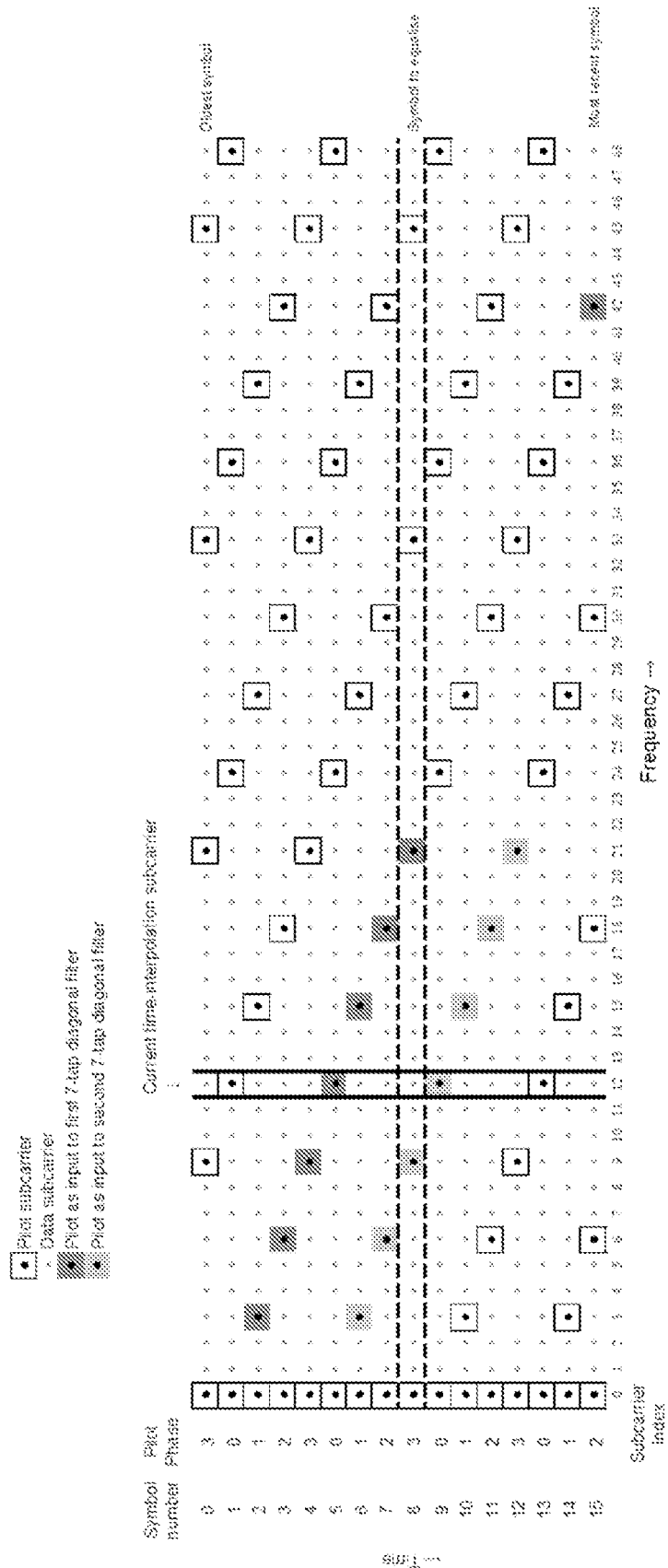
FIG. 8 is a 2D frequency-time plot showing filtering of the scattered pilots before a time interpolation.
Figure 9:
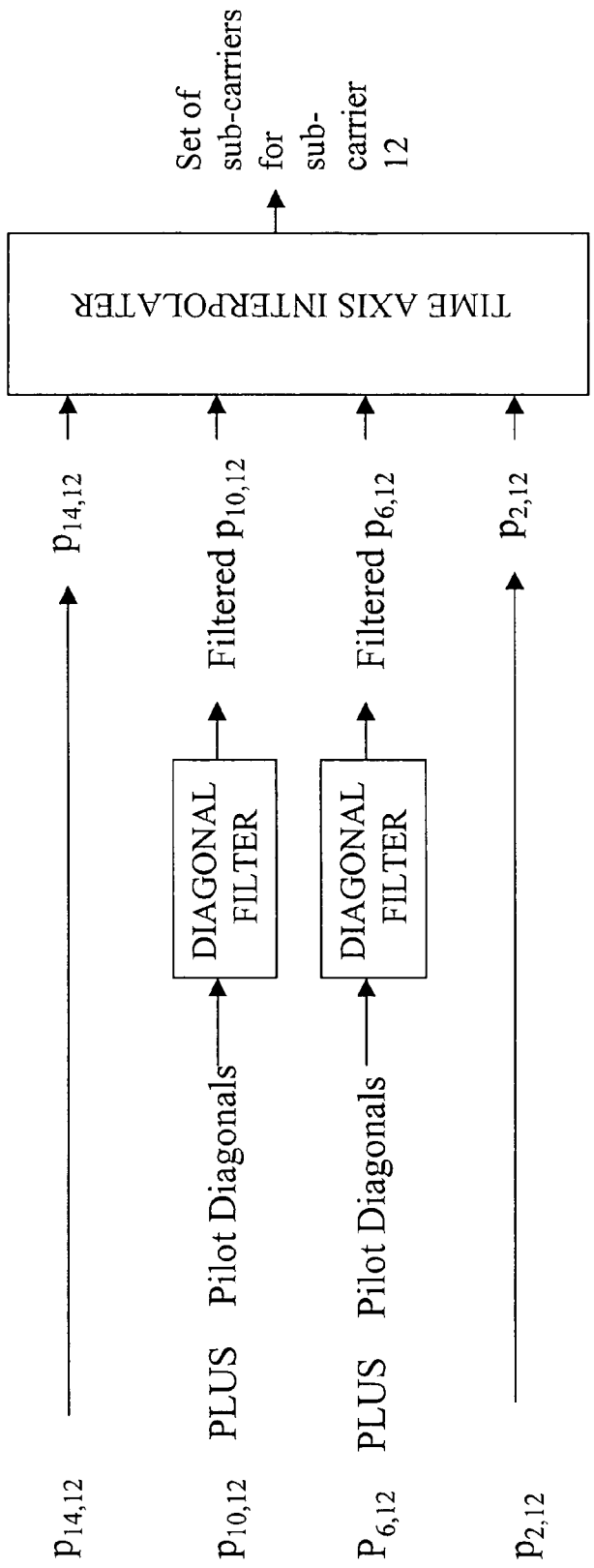
FIG. 9 is a diagram of the apparatus used for the filtering and interpolation shown in FIG. 8.

FIG. 8 shows a subset of the time frequency plane for 16 consecutive OFDM symbols. As in FIGS. 1 to 5, the scattered pilots are highlighted in the diagram. In this example, the channel estimate for symbol number 7 is being estimated (symbol number 0 is the most recently received).

In the absence of filtering (i.e. using the raw pilot values), the channel estimate is formed by first interpolating between scattered pilots in the time axis (upsampling by a factor 4) and then using those channel estimates to upsample in the frequency axis (upsampling by a factor 3).

The interpolation in time would produce all values at every 3rd sub-carrier including channel estimates for $p_{7,0}$, $p_{7,3}$, $p_{7,6}$ and so on. In FIG. 8, the generation of $p_{7,12}$ is highlighted, and this uses the scattered pilots on sub-carrier 12 from other symbols both proceeding and preceding symbol 7.

In this example, the diagonal filtering is used prior to the time interpolation stage to remove some broadband noise from the pilots. FIG. 8 shows the application of two diagonal filters to remove noise from channel estimates $p_{10,12}$ and $p_{6,12}$. Note that $p_{14,12}$ and $p_{2,12}$ are not filtered in this example since, to do so, would require additional symbol storage and these two are less dominant contributors of noise to the interpolation stage. With the seven filter coefficients of the diagonal filter defined as $h_0$ to $h_6$ (i.e. m=7 in FIG. 4), the noise reduced pilot estimates $\hat{p}_{10,12}$ and $\hat{p}_{6,12}$ given by:

$$\hat{p}_{10,12} = p_{13,3}h_0 + p_{12,6}h_0 + p_{11,9}h_2 + p_{10,12}h_3 + p_{9,15}h_4 + p_{8,18}h_5 + p_{7,21}h_6$$

and $$\hat{p}_{6,12} = p_{9,3}h_0 + p_{8,6}h_1 + p_{7,9}h_2 + p_{6,12}h_3 + p_{5,15}h_4 + p_{4,18}h_5 + p_{3,21}h_6$$

When diagonal filtering is enabled, the inputs to the time interpolation stage for sub-carrier 12 are now $p_{14,12}$, $\hat{p}_{10,12}$, $\hat{p}_{6,12}$ and $p_{2,12}$. This is shown in FIG. 9.

For the diagonal filtering that precedes frequency axis filtering (Example 1), we can use 15 taps for a pilot store sized to allow 4-tap time interpolation (in general 4n−1 where n is the number of taps for time interpolation). For the diagonal filtering that precedes time axis filtering (Example 2) we must either increase the size of the pilot store or we must reduce the number of taps to avoid the need for pilots from symbols earlier or later than those held in the pilot store. This is why the number of taps in Example 2 is only 7 as compared with 15 in Example 1.

In the examples described, the diagonals are chosen to satisfy Equation (1). However, as previously mentioned, this is not necessary and the diagonals may lie in any diagonal direction on the symbol/sub-carrier (n-k) plane. However, for DVB-T and other standard TV systems, where the spacing of the pilot sub-carriers in each symbol is 12 and the pilots in each symbol are shifted relative to the adjacent symbol by 3 sub-carriers, the most effective filtering technique is the one where n and k satisfy the relationship given in Equation (1). This is because these diagonals have the highest effective sampling rate which gives the best SNR after filtering.

In the examples discussed, the diagonal filtering is carried out before any interpolation. Indeed this is preferable but not essential.

In fact, all orders of operation are possible (though some are very inefficient). The good orders of operation are:

1) Diagonal filtering followed by frequency interpolation by a factor 12 (like Example 1). This is good when $\tau_{max}$<24/NT.

2) Diagonal filtering followed by time interpolation by a factor 4 and frequency interpolation by a factor 3. This is good when $\tau_{max}$>24/NT and the Doppler frequency is not too high).

One application of the invention is for a receiver for OFDM signals. The receiver may be arranged to filter the received signals diagonally in accordance with the invention in order to remove broadband noise. Then, the receiver can interpolate the sub-carriers and, from the obtained channel estimates, derive the transmitted OFDM signal. As already mentioned, OFDM transmission is used in digital TV systems (e.g. DVB-T (Digital Video Broadcasting-Terrestrial), DVB-H (Digital Video Broadcasting-Handheld) and ISDB-T (Integrated Services Digital Broadcasting-Terrestrial)). One particular application of the invention is in a mobile digital TV receiver. OFDM is also used in digital audio broadcasting (such as Eureka 147, HD Radio, T-DMB and ISDB-TSB), ADSL and VDSL broadband access and IEEE 802.11a and 802.11g Wireless LANs amongst others and the invention is applicable to any such systems which use OFDM signals having pilots for channel estimation.

What is claimed is:

1. A method for filtering a received Orthogonal Frequency Division Multiplexed (OFDM) signal to reduce noise, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, the method comprising:

producing a filtered version of a selected pilot sub-carrier to be used in subsequent interpolation, by inputting into respective taps of an m-tap filter, m pilot sub-carriers which each have different positions in the time direction and in the frequency direction and such that each position satisfies a relationship between n and k so that the m pilot sub-carriers collectively define a single linear diagonal line in the time frequency plane.

2. A method according to claim 1, further comprising the steps of:

repeating the step of producing a filtered version of a selected pilot sub-carrier for a plurality of pilot sub-carriers; and interpolating the OFDM signal using the plurality of the filtered selected pilot sub-carriers.

3. A method according to claim 2, wherein the step of interpolating further uses at least one unfiltered pilot sub-carrier.

4. A method according to claim 2, wherein the step of interpolating comprises interpolating by a factor a/b in the frequency direction.

5. A method according to claim 2, wherein the step of interpolating comprises interpolating by a factor a/b in the time direction.

6. A method according to claim 2, wherein the step of interpolating is performed by a multi-rate polyphase filter.

7. A method according to claim 1, wherein the relationship between n and k defines a diagonal in the n-k plane which has the highest ratio of pilot sub-carriers to non-pilot sub-carriers of any diagonal.

8. A method according to claim 1, wherein the relationship between n and k is given by: k−b·n=aD, where D is an integer.

9. A method according to claim 1, wherein a=12 and b=3.

10. A method according to claim 1, wherein the step of producing a filtered version of a selected pilot sub-carrier is performed by a Wiener filter matched to the relative levels of signal and noise in the pilot sub-carriers.

11. A method according to claim 1, wherein the step of producing a filtered version of a selected pilot sub-carrier is performed by a low-pass filter.

12. A non-transitory computer readable storage medium having stored thereon a computer program which, when run on a computing means, causes the computing means to filter a received Orthogonal Frequency Division Multiplexed, OFDM, signal, to reduce noise, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, by the steps comprising:

producing a filtered version of a selected pilot sub-carrier to be used in subsequent interpolation and inputting into respective taps of an m-tap filter, m pilot sub-carriers which each have different positions in the time direction and in the frequency direction and such that each position satisfies a relationship between n and k so that the m pilot sub-carriers collectively define a single linear diagonal line in the time frequency plane.

13. A record carrier with a non-transitory computer readable medium having stored thereon a computer program which, when run on a computing means, causes the computing means to filter a received Orthogonal Frequency Division Multiplexed, OFDM, signal to reduce noise, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, by the steps of:

producing a filtered version of a selected pilot sub-carrier to be used in subsequent interpolation and inputting into respective taps of an m-tap filter, m pilot sub-carriers which each have different positions in the time direction and in the frequency direction and such that each position satisfies a relationship between n and k so that the m pilot sub-carriers collectively define a single linear diagonal line in the time frequency plane.

14. A non-transitory computer readable storage medium having stored thereon a computer program which, when run on a computing means for filtering a received OFDM, Orthogonal Frequency Division Multiplexed, signal, reduces noise, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, by the steps of:

a) filtering a selected pilot sub-carrier, by inputting into respective taps of an m-tap filter, m pilot sub-carriers which each have different positions in the time direction and in the frequency direction and such that each position satisfies a relationship between n and k so that the m pilot sub-carriers collectively define a single linear diagonal line in the time frequency plane;

b) repeating step a) for a plurality of pilot sub-carriers; and c) interpolating, in the time dimension or in the frequency dimension, using the plurality of filtered selected pilot sub-carriers from step b).

15. Apparatus for filtering an OFDM, Orthogonal Frequency Division Multiplexed, signal to reduce noise, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, the apparatus comprising:

an m-tap filter for filtering a selected pilot sub-carrier to be used in subsequent interpolation, the filter being arranged to receive m pilot sub-carriers, into the respective m taps, which each have different positions in the time direction and in the frequency direction and such that each position satisfies a relationship between n and k so that the m pilot sub-carriers collectively define a single linear diagonal line in the time frequency plane.

16. Apparatus according to claim 15, further comprising a plurality of m-tap filters for producing filtered versions of a plurality of selected pilot sub-carriers.

17. Apparatus according to claim 16, further comprising an interpolator for interpolating the OFDM signal using the plurality of filtered selected pilot sub-carriers.

18. Apparatus according to claim 17, wherein the interpolator uses at least one unfiltered pilot sub-carrier.

19. Apparatus according to claim 17, wherein the interpolator is arranged to interpolate by a factor a/b in the frequency direction.

20. Apparatus according to claim 17, wherein the interpolator is arranged to interpolate by a factor a/b in the time direction.

21. Apparatus according to claim 17, wherein the interpolator is a multi-rate polyphase filter.

22. Apparatus according to claim 15, wherein the relationship between n and k defines a diagonal in the n-k plane which has the highest ratio of pilot-carriers to non-pilot sub-carriers of any diagonal.

23. Apparatus according to claim 15, wherein the relationship between n and k is given by: $k-b \cdot n = aD$, where D is an integer.

24. Apparatus according to claim 15, wherein a=12 and b=3.

25. Apparatus according to claim 15, wherein the filter comprises a Wiener filter matched to the relative levels of signal and noise in the pilot sub-carriers.

26. Apparatus according to claim 15, wherein the filter comprises a low-pass filter.

27. Apparatus according to claim 15, wherein the apparatus is a receiver for OFDM signals.

28. Apparatus according to claim 27, wherein the receiver for OFDM signals is a mobile television receiver.

29. A receiver for receiving an OFDM, Orthogonal Frequency Division Multiplexed, signal, the OFDM signal comprising a plurality of symbols n in the time direction, each symbol comprising a plurality of sub-carriers k in the frequency direction, each a-th sub-carrier of each symbol being transmitted as a pilot sub-carrier with known amplitude and phase, and each symbol having its pilot sub-carriers spaced by b sub-carriers relative to the adjacent symbol, the apparatus comprising:

a plurality of m-tap filters to produce filtered versions of a plurality of selected pilot sub-carriers, each filter being arranged to receive m pilot sub-carriers, into the respective m taps, which each have different positions in the time direction and in the frequency direction and such that each position satisfies a relationship between n and k so that the m pilot sub-carriers collectively define a single linear diagonal line in the time frequency plane;

an interpolator for interpolating the OFDM signal using the plurality of filtered selected pilot sub-carriers; and a demodulator for deriving the originally transmitted signal from the interpolated sub-carriers.

* * * * *